Nov. 25, 1969  C. E. GRAY  3,480,051
FOLDING BANDSAW-DISC SANDER
Filed May 3, 1968  2 Sheets-Sheet 2

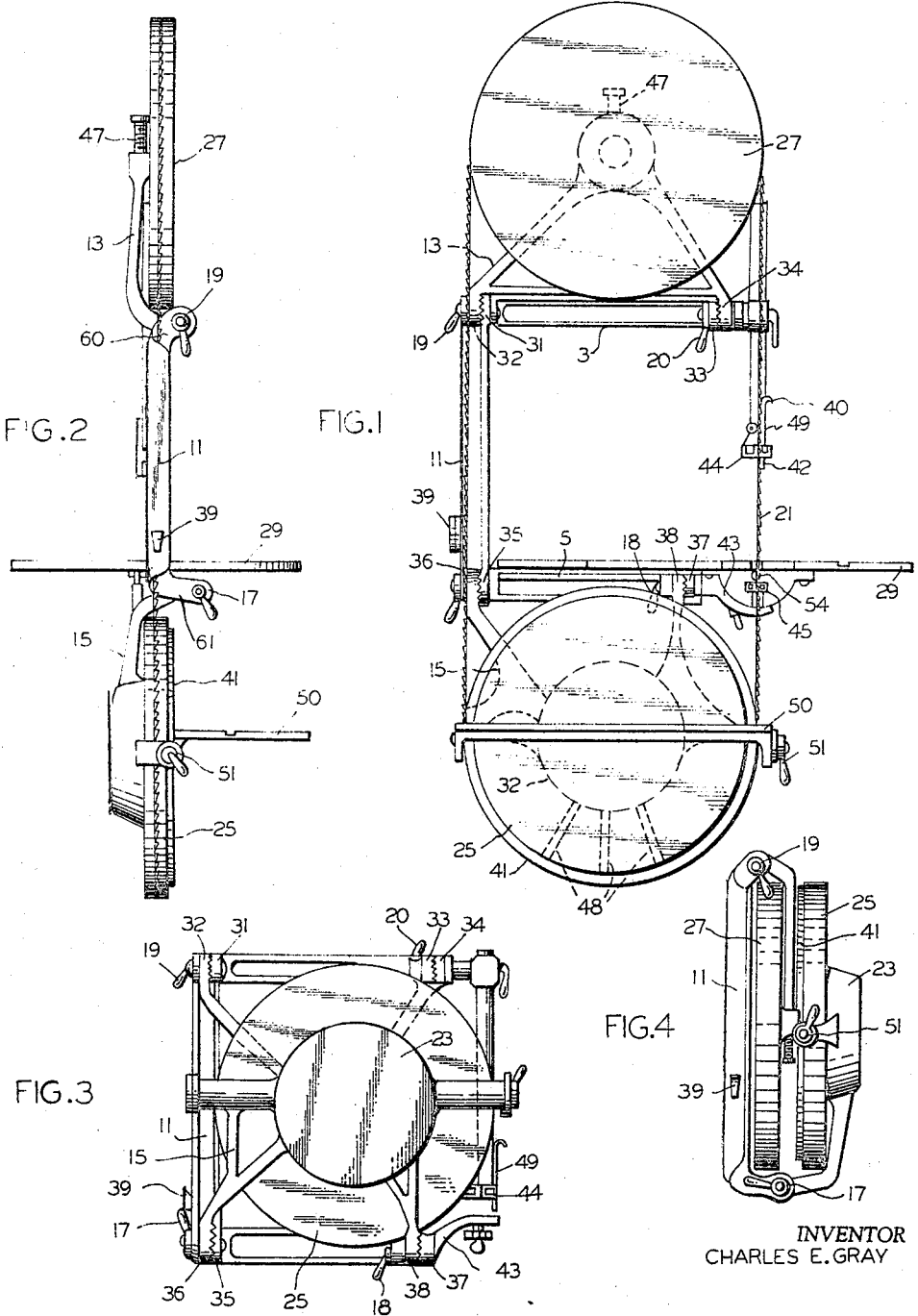

INVENTOR
CHARLES E. GRAY

BY *William D. Stoker*
ATTORNEY

United States Patent Office

3,480,051
Patented Nov. 25, 1969

3,480,051
FOLDING BANDSAW-DISC SANDER
Charles E. Gray, 107½ S. Main St.,
Elkhart, Ind. 46514
Filed May 3, 1968, Ser. No. 726,349
Int. Cl. B27c 7/00
U.S. Cl. 144—1     8 Claims

ABSTRACT OF THE DISCLOSURE

A portable bandsaw-disc sander combination tool mounted on a collapsible, sectional supporting frame.

---

This invention relates to bandsaws and, more specifically, to a bandsaw mounted on a collapsible frame.

The prior art is replete with disclosures directed to bulky, stationary band saw units. These devices must be installed in a fixed, essentially permanent fashion prior to use and, therefore, cannot be easily transported from one work location to another work location. This pronounced disadvantage of lack of portability of prior art devices has in itself prevented a more wide-spread use of bandsaws among professional carpenters, amateur handymen, hobbyists and the like. In addition, a bandsaw, by providing an endless saw band continuously driven in one direction, is of necessity composed of rather bulky elements. Further, the high rate of revolution of the saw blade develops considerable vibratory motion in the supporting frame. These factors, as well as others well known to those working in the art, have prevented greater use of bandsaws among tradesmen or handymen desiring a portable saw unit.

A bandsaw possesses many advantages, well known to professional and amateur tradesmen alike, when compared to sabre, jig and hand coping saws. The most proficient craftsman has great difficulty in quickly and accurately cutting intricate designs containing smooth curves without splintering the work piece using conventional jig and sabre saws. At the present time, carpenters are forced to employ archaic hand coping saws for trimming coping mouldings and shaping rounded work pieces such as cabinets and table tops, and for performing other carpentry functions involving delicate curvatures such as scalloping and arching. A bandsaw will perform all of the above functions as well as routine straight cuts accurately and quickly without splintering the work piece. In addition, a bandsaw is the ideal cutting tool for the model hobbyist, enabling the cutting of complex patterns easily and accurately. Thus, a bandsaw possesses various atrributes not found in other sawing tools and would be a great asset to professional and amateur carpenters if available in a portable, lightweight unit capable of being carried by the tradesman or hobbyist to the job site.

Therefore, it is an object of this invention to overcome the disadvantages of prior art bandsaws preventing greater use thereof by providing a novel lightweight, portable bandsaw comprised of a continuous bandsaw blade with supplementary driving means mounted on a collapsible supporting frame.

Another object of this invention is to disclose a novel portable bandsaw-sander combination tool having a foldable supporting frame.

A further object of this invention is to disclose a lightweight, collapsible bandsaw which may be carried by carpenters and other tradesmen to the job site.

Still another object of this invention is to provide a portable bandsaw which may be used either free-hand or while temporarily mounted on a support.

The present invention overcomes the disadvantages of prior art bandsaws which have prevented greater usage thereof, by providing a lightweight, readily transportable bandsaw unit. In essence, the present invention relates to a bandsaw, including an endless saw blade carried by and in tension between a drive wheel and an idler, mounted on a collapsible supporting frame formed of a plurality of movably connected sections.

In one preferred embodiment of the invention at least one abrasive disc is carried by the drive wheel and/or idler wheel to provide a sander in combination with a bandsaw. When the lower wheel is not used to carry an abrasive disc, means, such as a plurality of apertures within the outer face of the wheel, may be provided for mounting face plate work or metal spinning accessories.

In another preferred embodiment of the invention, impellers may be positioned within the lower wheel to draw sawdust and abrasive dust particles created during sawing or sanding operations into a suitably placed receptacle.

In one embodiment of the invention, the frame member is comprised of 3 hingedly connected sections of approximately equal length, there being a first lower flap section to which is attached a drive wheel, a second upper flap section to which is attached an idler wheel and a center section which carries a work support member.

In operable condition, the extended frame provides a rigid, non-vibratory support for the bandsaw assembly, including an endless saw blade, driving means and an idler. The sections of the frame having the parts of the bandsaw assembly mounted thereon in spaced relationship are movably connected so that they may be readily collapsed into a flat, compact unit having a fraction of the length of the fully extended frame. The supporting frame may be of a foldable type, extendable-retractable type, or any combination thereof.

Means are provided to secure the sections of the frame in extended operable position as well as in compact, easily transportable position.

Reference is now made to the drawing accompanying the application.

FIGURE 1 is a front elevation of one embodiment of the novel bandsaw of this invention in sawing position;

FIGURE 2 is a side elevation of the same device in sawing position;

FIGURE 3 is a plan view of the same device in folded compact position;

FIGURE 4 is a side view of the same device in folded compact position;

Reference is now made to the drawings wherein like reference characters designate like or corresponding parts throughout the several views.

Figure 6:
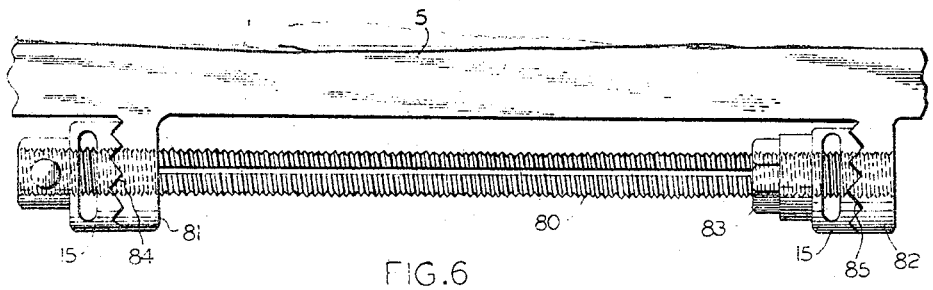
FIGURE 6 shows other alternative means to lock the frame sections in operable or inoperable position.

Referring now in greater detail to the drawings, and in particular FIGURES 1-4, it will be noted that an embodiment of my invention in specific structural detail is set out.

The support frame member is composed of a center C-frame section 11 having parallel arms 3 and 5 to which there are pivotally attached upper and lower outer frame flap sections 13 and 15 respectively. Upper and lower frame sections 13 and 15 are rotated about axes defined by the parallel arms of the center C-frame to provide either a fully extended operable bandsaw or a closed, compact, easily transportable unit. When the bandsaw is in operable position, serrated faces 31 and 33 on the upper arm 3 and serrated faces 35 and 37 on the lower arm 5 of the center C-frame section are engaged by mating pairs of serrated faces 32 and 34 and 36 and 38 on the upper and lower flap frame sections, respectively.

Lug bolts 17, 18, 19 and 20 serve the dual functions of securing the bandsaw in extended operable position as shown in FIGURES 1–2, or when folded into the compact unit as shown in FIGURES 3–4. It should be noted that in the embodiment of the invention disclosed in FIGURES 1–4, the parallel arms of the C-frame section extend outwardly on the same side of the C-frame section by means of flanges of differing lengths 60 and 61. This enables the folding of the two outer flap sections in sequence inwardly toward the same side of the center frame section to form a highly compact unit.

Referring to the embodiment of the invention disclosed in FIGURES 1–4 in greater detail, the lower frame member 15 supports the drive wheel 25 which is powered by a pancake motor 23. The outer face 41 of the wheel 25 is provided with an abrasive such as a sheet of sandpaper and serves as a disc sander. Impellers 48 may be provided in the lower drive wheel to draw the dust created during the sanding and sawing operations into a small bag or the like.

Upper frame member 13 supports the idler wheel 27. A bandsaw blade 21 is driven in the conventional manner by means of the pancake motor between wheels 25 and 27.

A keystone lug 39 allows the mounting of the band saw-disc sander on a special bracket cooperating therewith. The bracket can be temporarily or permanently mounted on a wall, wall stud, table top, saw horse or other suitable support.

Adjustable and detachable support tables are provided for sawing and for sanding at 29 and 50 respectively. These support members are conventional in the art and are useful as a guide for rip, cross-cut and miter gauges.

As shown in FIGURE 1, stationary guide 45 and roller guide 54 are positioned below support table 29 while reciprocable guide 44 is positioned above the sawing surface. Finger lift 40 includes slide member 49 having lower extension 42 which may be lowered to support table 29, thereby enabling the positioning of guide 44 to within an inch or two above support table 29. Slide member 49, being positioned in back of and parallel to the saw blade prevents deflection and rotation of the saw blade and further, in its lowered position facilitates the removal of stock material from the sawing surface.

Various table adjustment means are in common use in the art and may be incorporated into the invention. For instance, handle 51 locks sander table 50 into operable position and support table 29 may be tilted about its trunnion. Other sawing and sanding support table modifications such as the incorporation of a peg type movable rest into the sander table may also be employed with the novel portable bandsaw-disc sander. Further, both upper and lower guide assemblies may be made rotatable to properly align and adjust the saw blade for jig radius cutting, circle cutting or the like.

As may be appreciated, various means may be substituted for certain of the means disclosed in the preferred embodiments of the invention. For instance, other suction-producing means, such as a compact, light-weight pump, may be employed to perform the same functions as impellers 48. Various means, many of which will appear obvious to those of ordinary skill in the art, may be utilized to secure the hinged outer frame section in either extended or compacted condition. Many different types of locks, cams and set screws would suffice. Moreover, for the mating serrated faces there may be substituted other intermeshing configurations such as complementary corrugated faces.

Figure 5:
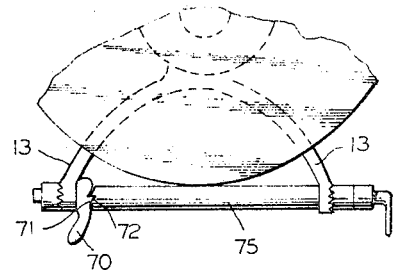
FIGURE 5 shows alternative means to lock the frame sections in operable or inoperable position.

For example, a simple lever operated cam in conjunction with a laterally movable sleeve could be positioned to urge the complementary serrated faces into interolcking engagement. Such a possible alternative structural arrangement is illustrated by FIGURE 5. When cam lever 70 is rotated inwardly, faces 71 and 72 on the lever and laterally movable sleeve 75 are yieldingly forced into engagement, thereby urging 13—13 outwardly to secure the frame sections in operable or inoperable position.

Another type of locking device is illustrated by FIGURE 6. Externally threaded bolt 80 passes freely through outer frame sections 15—15, but is threadably engaged by lugs 81 and 82 which are integral with center frame section 5. An adjustable but locking collar is shown at 83. Rotation of the threaded bolt forces complementary serrated faces on the outer frame section 15—15 to lockingly engage serrated faces 84 and 85 of the lugs 81 and 82. A decided advantage of this quick-acting cam-sleeve hinge lock is that only one such lock need be employed for each foldable section present.

Instead of the outer frame sections being hingedly connected to the center frame section, other types of movable connection for the collapsible frame member may be used. For instance, an extendable-retractable slide or reversible slide connection could be employed. With the use of the preferred center C frame, the outer flap frame sections need not fold inwardly on the same side of the center frame section. In some instances, depending upon the particular mechanism chosen, it would not be necessary for the center section to be in the shape of a C.

The device if this invention has been described in its operative condition. It will be appreciated that with no sacrifice in operability or stability the present device can be folded into a compact unit as shown in FIGURES 3 and 4.

In order to collapse the device as illustrated in FIGURES 1–4, the work support members 29 and 50 are detached and the blade is removed by releasing the quick acting cam release 47. Lug bolts 17, 18, 19 and 20 are loosened and the device is collapsed by first folding the top section and then the bottom section inwardly toward the center C-frame section. Lower guide support member 43 is rotated toward the center of the unit and then lug nuts 17, 18, 19 and 20 can be re-tightened to secure the device in folded position.

Figure 7:
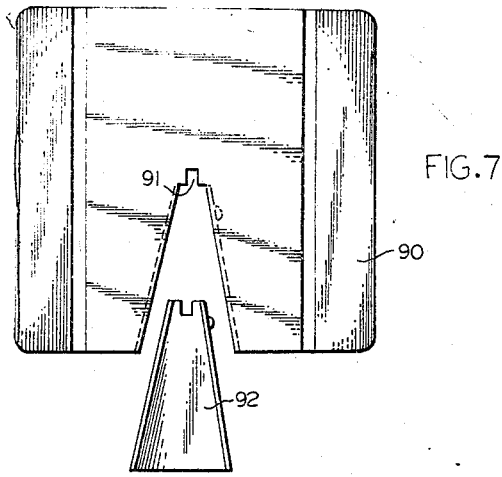
FIGURE 7 shows a modified detachable sawing support table having a removable truncate insert terminating at the saw blade aperture. Disconnection of this insert enables free-hand use of the bandsaw detached from any supporting structure.

FIGURE 7 is a plan view of a modified bandsaw table featuring a removable truncated insert 92. The saw band passes thru aperture 91 in the detachable support saw table 90. With the slidably removable wedge in position and the frame being given stability by means of keystone lug 39 engaging its complementary bracket mounted on a suitable support as disclosed hereinbefore, the saw is ready for normal sawing use. At times, when warranted by the particular sawing job, it is advantageous to have available a free-hand bandsaw capable of use detached from any supporting member. As can be visualized, the incorporation of the modified bandsaw table as illustrated in FIGURE 7 into the novel portable bandsaw of this invention enables its conversion into a free-hand saw unit by removal of the wedge insert from the saw table and inversion of the unit by the operator. This is another decided advantage of the invention.

It is contemplated that a convenient carrying case-wheel guard device be used in conjunction with this tool. In use, two separate sections of a protective cover would shield the upper and lower wheels. These covers would be easily removable and would fit together to form a carrying case for the folded device and accessories. The carrying case-wheel guard can be made of any suitable material such as sheet metal or plastic. A 10-inch saw can be folded into a small case of about 11 inches square and 5 inches deep. The 10-inch size is convenient because it is large enough to keep blade crystallization at a minimum and small enough to be very portable.

Various other modifications such as the use of a greater number of foldable flap sections than shown in the preferred embodiments may be made in the invention without departing from the spirit thereof. It is to be understood that the scope of the invention is to be defined by the appended claims.

I claim:

1. A bandsaw assembly comprising a supporting frame formed of a plurality of pivotally connected sections; said frame being positionable in a first fully extended operable position and in a second folded-up inoperable position with means for locking said frame in either of said positions, said bandsaw assembly on said frame including driving means, an idler means, and an endless saw band carried by, and in tension between said driving and idler means.

2. The bandsaw assembly of claim 1 wherein said driving means is a wheel driven by a pancake motor.

3. The bandsaw assembly of claim 1 wherein an abrasive disc is carried by the drive wheel.

4. The bandsaw assembly of claim 1 including means to draw particulate matter away from the work surfaces.

5. A bandsaw comprising a foldable supporting frame formed of a plurality of hingedly connected frame sections, said frame including at least two outer frame sections and an inner C-frame section having two parallel arms, each arm being hingedly attached to an outer frame section; an idler wheel mounted on an outer frame section to one side of said center frame section; a drive wheel and driving means mounted on an outer frame section on the other side of said center frame section and an endless saw band carried by and in tension between said idler and drive wheels.

6. The bandsaw of claim 5 wherein there are a plurality of faces on said parallel arms; there are a plurality of mating faces on said outer frame sections; and means are provided to urge said complementary faces into interlocking engagement.

7. A bandsaw comprising a foldable supporting frame formed of a center C-frame section having two parallel arms which extend outwardly different lengths to the same side of the frame and first and second outer frame sections, each of said outer frame sections being pivotably attached to a different one of said parallel arms, said parallel arms and said outer frame sections having a plurality of mating serrated faces; an idler wheel mounted on said first outer frame section; a pancake motor and a drive wheel driven by said motor mounted on said second outer frame section; an abrasive disc carried by said drive wheel; a detachable and adjustable saw support table having a saw band aperture mounted on said center C-frame section; a detachable and adjustable sanding support table mounted on said second outer frame section; a removable endless saw band passing through the saw band aperture and carried by and in tension between said idler and drive wheels and means to urge said mating serrated faces into interlocking engagement.

8. The bandsaw of claim 7 wherein said sawing support table contains a removable insert, one edge of which terminates at the saw band aperture, of sufficient size to enable use of the band saw detached from a support.

References Cited

UNITED STATES PATENTS 2,593,760   4/1952   James   143—19.5

FOREIGN PATENTS 718,334   11/1954   Great Britain.

ANDREW R. JUHASZ, Primary Examiner

G. WEIDENFELD, Assistant Examiner

U.S. Cl. X.R.

83—201; 143—17